(12) United States Patent  (10) Patent No.: US 8,504,667 B2
Howorka et al.  (45) Date of Patent: Aug. 6, 2013

(54) DISTRIBUTION OF DATA TO MULTIPLE RECIPIENTS

(75) Inventors: Edward Howorka, Denville, NJ (US); Peter R. Horsfall, Jersey City, NJ (US); Steven W. Iaccheo, Pompton Plains, NJ (US); Michael S. Merold, Sparta, NJ (US); Schalk M. Steyn, Morristown, NJ (US)

(73) Assignee: EBS Group Limited, London (GB)

( * ) Notice: Subject to any disclaimer, the term of this patent is extended or adjusted under 35 U.S.C. 154(b) by 990 days.

(21) Appl. No.: 12/512,484

(22) Filed: Jul. 30, 2009

(65) Prior Publication Data

US 2010/0082767 A1  Apr. 1, 2010

Related U.S. Application Data

(63) Continuation of application No. 12/332,023, filed on Dec. 10, 2008, now abandoned, which is a continuation-in-part of application No. 11/530,294, filed on Sep. 8, 2006, now Pat. No. 7,848,349.

(60) Provisional application No. 60/715,355, filed on Sep. 8, 2005.

(51) Int. Cl.
  *G06F 15/16* (2006.01)
(52) U.S. Cl.
  USPC ........................................................ 709/223
(58) Field of Classification Search
  USPC ........................................................ 709/217
  See application file for complete search history.

(56) References Cited

U.S. PATENT DOCUMENTS

| | | | |
|---|---|---|---|
| 4,736,371 A | 4/1988 | Tejima et al. | |
| 5,036,538 A | 7/1991 | Oken et al. | |
| 5,375,055 A | 12/1994 | Togher et al. | |
| 5,805,573 A | 9/1998 | Umeda | |
| 5,818,474 A * | 10/1998 | Takahashi et al. | 347/15 |
| 5,930,263 A | 7/1999 | Nielsen | |
| 5,956,321 A | 9/1999 | Yao et al. | |
| 6,011,801 A | 1/2000 | Solomon | |
| 6,463,076 B1 | 10/2002 | Suzuki | |
| 6,807,635 B1 | 10/2004 | Kleckner | |
| 6,894,990 B1 | 5/2005 | Agarwal et al. | |
| 7,130,824 B1 | 10/2006 | Amanat et al. | |
| 7,433,842 B2 * | 10/2008 | Toffey | 705/37 |
| 7,444,422 B1 | 10/2008 | Li | |
| 7,660,583 B2 | 2/2010 | Pekonen et al. | |
| 7,801,796 B2 * | 9/2010 | Friedman et al. | 705/37 |
| 7,933,830 B1 * | 4/2011 | Buck | 705/37 |

(Continued)

FOREIGN PATENT DOCUMENTS

| | | |
|---|---|---|
| GB | 2430126 A | 3/2007 |
| WO | WO-02/17559 | 2/2002 |
| WO | WO-03/003237 A2 | 1/2003 |
| WO | WO-2004/105282 | 12/2004 |

*Primary Examiner* — John MacIlwinen
(74) *Attorney, Agent, or Firm* — Dickstein Shapiro LLP

(57) ABSTRACT

In a trading system market data from a matching engine is distributed by a broker to a plurality of trading floors repeatedly every T seconds, typically one second. This one second distribution period is divided into a plurality of time slots and each trading floor is randomly assigned to a slot. Data for a given trading floor is calculated and distributed during the time slot assigned to that floor. The position of a trading floor relative to others is varied by swapping a pair of adjacent time slots every J distribution periods.

44 Claims, 4 Drawing Sheets

U.S. PATENT DOCUMENTS

| | | |
|---|---|---|
| 2002/0161692 A1 | 10/2002 | Loh et al. |
| 2003/0061148 A1 | 3/2003 | Alavian |
| 2004/0044608 A1 | 3/2004 | Young |
| 2005/0053027 A1 | 3/2005 | Lampin et al. |
| 2005/0219039 A1 | 10/2005 | Allen |
| 2005/0283426 A1 | 12/2005 | Krishnasami et al. |
| 2008/0109343 A1 | 5/2008 | Robinson et al. |
| 2010/0318673 A1* | 12/2010 | Kemp et al. .................. 709/232 |

* cited by examiner

DISTRIBUTION OF DATA TO MULTIPLE RECIPIENTS

CROSS REFERENCE TO RELATED APPLICATIONS

This application is a Continuation of application Ser. No. 12/332,023, filed Dec. 10, 2008, which is a Continuation-In-Part of U.S. application Ser. No. 11/530,294, filed Sep. 8, 2006, and claims benefit of U.S. Provisional Application No. 60/715,355, filed Sep. 8, 2005, each of which is incorporated herein by reference.

FIELD OF THE INVENTION

This invention relates to the distribution of data from a data source to multiple recipients. It is particularly concerned with the distribution of time critical data for example from trading systems to trader devices trading on the system in which relative delay of trading data from one device to another can affect the ability to trade effectively

BACKGROUND TO THE INVENTION

There are many examples in the art of computerised, automated trading systems which enable parties to buy and sell products by entry of trading information. Trading systems are widely used in the financial industry, for example, to trade financial products such as equities, commodities, FX products and other financial instruments. One example of a known trading system used to trade FX spot is disclosed in U.S. Pat. No. 5,375,055 of Togher et al. The system described in this publication is an anonymous trading system in which counterparties submit orders into the market without revealing their identity. A party trading on the system does not know the identity of a counterparty to a deal until the deal has been completed. To avoid parties entering into trades with parties they consider to be untrustworthy, the system uses bilateral credit limits. Each party submits details of the credit they extend to each other possible counterparty on the system. If a party does not wish to trade with a certain counterparty they extend no credit to that counterparty. The system filters visible quotes (bids and offers) entered into the system and only displays to a given counterparty, visible quotes originating from parties with whom they have bilateral credit. The determination of whether a quote should be seen is made on the basis of a yes/no credit matrix, but before a deal is completed the credit of each counterparty to the deal is check to ensure that both have sufficient credit for the amount of the deal. If they do not, the amount of the deal may be reduced to conform to the credit available.

The system disclosed in U.S. Pat. No. 5,375,055 has been embodied for many years in the EBS Spot trading system operated by EBS Group Limited of London UK. The system comprises a group of matching engines or arbitrators which receive quote information from trader devices on the systems and match quotes to complete deals, subject to credit checking. The arbitrators also distribute market data to trader devices via an intermediate node which prepares a market view to enable traders to see the quotes that are being made by other traders in the market as well as providing them with other information regarding the state of the market. The EBS system only shows the trader devices the best price that they can deal a regular amount, defined as a basic volume in the instrument being traded, for example $10 Million; the best dealable price available, which might be for a smaller volume, and the best price on the system, which will be different if the trading floor to which the trader device is attached does not have bilateral credit with the provider of the quote.

In the Tog her system, market distributors prepare individual market views for each trading floor based on their credit, so that each trading floor will see a different, personalised view of the market. The market views are distributed via bank nodes which hold actual credit limits and which perform the final credit checks before a deal is completed. The trader devices may be conventional workstations through which traders input quoted, usually via a dedicated keypad and which include a display of market information enabling the trader to monitor the market and so make trading decisions. Alternatively, there may be automated trading interfaces which are computers which submit orders into the market under the control of a trading model or algorithm which responds to market data received from the system. In a more recent version of the system, the market distribution and bank node functions are integrated within broker nodes.

In any trading system there exists an issue of fairness in the distribution of quotes which can be traded. If one trader sees a quote before another trader they are able to deal that quote before it has been seen by that trader. If this advantage is built into the system the system lacks credibility and many parties will not see the benefit of trading on it. Issues of quote distribution are not material in slow moving markets, or in systems where quotes are guaranteed to be available to a certain period of time, such as is the case in many Internet based systems in which latency is hard to control. However, in very fast moving markets such as the interbank FX spot market they are critical.

The relative time at which quotes are received by trader devices depends partly on the location of the trading device with respect to the distribution device, in this case the arbitrator, and partly on the manner in which the quotes are distributed. As messages from the system take a finite time to travel to the trader terminals, those terminals that are physically closer to the arbitrator have an advantage. In practice, many of the trading floors using the EBS system are concentrated around the physical location of the arbitrators which are in the major FX trading centres: London. New York and Tokyo. In the Togher system, prices are distributed to trader devices every second with the order of distribution being determined by when the trading floor logged on to the system. Thus one trading floor may log on at 80 mS past the second and another trading floor at 120 mS past the second. The floors will always have quotes distributed to them at 80 and 120 mS past the second respectively. If a new quote is available on the arbitrator for distribution at 60 mS past the second, the 80 mS trading floor will see it first and be able to trade it first. If a new quote is available at 100 mS, the 120 mS trading device will see it first as the 80 mS device will not see it for 980 mS, 960 mS after the 120 mS device. Situations can arise where, for a while, one trading floor is repeatedly seeing quotes slightly after another trading floor. This situation can last for a long time and is not limited to floors receiving data from the same source. It could be caused by proximity to floors on other market distributors. A trading floor's relative position is determined by when the floor's banknode first connects to an arbitrator after an arbitrator restart.

More recently the architecture of the EBS system has been altered and the market distributors and market access nodes, or bank nodes, of the Togher system have been replaced by broking nodes. Broking nodes, or brokers, sit logically between the trading devices and the arbitrators and are responsible for a number of system functions, including distribution of quotes to the trader devices, as well as the submission of hits and quotes to the arbitrators, credit check and the storage of trade settlement instructions. Unlike the distribution system of the architecture disclosed in U.S. Pat. No. 5,375,055, the brokers distribute quotes received from the arbitrator to which they are connected once per second. The broker receives the quotes from the arbitrators, calculates the market view for each of the trading floors connected to it and distributes the market view for each trading floor, in turn, as quickly as it can. There are two key differences in this approach, both of which lead to fairness problems. First, the market views are prepared from the same quote information received from the arbitrator. In the previous version, market views were prepared from the quote information at the particular slot assigned to the trading floor that was slightly different for each floor. Second, as the market views are distributed in turn, a particular trading floor will always receive its data at a fixed time apart from any other trading floor. This can lead to a situation where, for example, a large trading floor having the highest speed communications available, and very quickly responding automated trading interfaces receives its data a little before a smaller trading floor which lower specification communications and a trading floor having only manual traders who are slower to react than computerised trading interfaces. The result is that the smaller floor will miss the quotes they want to hit every time the larger floor wants to trade them as the larger floor will have hit the quotes by the time the smaller floor sees them. This is disadvantageous to the smaller floor and leads to perceptions of unfairness in the system which can cast doubt over the integrity of the system. The problem may be characterised as one of long term firing proximity. It is the same problem as arises with the Togher architecture, as described above but is actually worse as a trading floor's position with respect to other floors on the broker is fixed and does not change when the floor logs on again, for example on the next trading day.

A further problem is that some floors will receive data a relatively long time after it was provided by the arbitrator and the market view was calculated. Regardless of the problems of others connected to the broker receiving the data first, the data is now ageing. This problem may be referred to as one of computation to delivery latency.

SUMMARY OF THE INVENTION

The invention aims to address the problems of unfairness discussed above. Broadly, one aspect of the invention resides in the provision of a system and method in which a data distribution period is divided into a number of slots and users, or data recipients, are each assigned to a time slot. The data to be distributed to a given recipient is calculated and distributed during that user's time slot. In another aspect of the invention a random slot in the data distribution period is calculated and the position of that random slot in the period is swapped, together with any data receiver assigned to that time slot, with another time slot.

More specifically, there is provided a method of periodically distributing data to a plurality of data receivers, comprising: dividing a data distribution period into a plurality of time slots; assigning each of the data receivers to a respective one of the time slots; and for each time slot having an assigned data receiver, during the time slot, calculating the data to be sent to the data receiver and sending the data to the data receiver.

This aspect of the invention also provides apparatus for periodically distributing data to a plurality of data receivers, comprising: a data distributor for distributing data to data receivers over a data distribution period, the data period being divided into a plurality of time slots; the data distributor comprising a slot assignor for assigning each of the data receivers to a respective one of the time slots; and a data calculator for calculating, during the time slot, for each time slot having an assigned data receiver, the data to be sent to the data receiver, the data distributor sending the data to the data receiver within the time slot.

Embodiments of this aspect of the invention have the advantage that computation to delivery latency is reduced as each data recipient has its data calculated separately during the time slot in which the data is sent to it.

Preferably, the data recipients are assigned to time slots randomly which has the advantage that data distribution tends to be uniformly spaced throughout the data distribution period. This maximises the time available for data distribution within the distribution period.

Preferably, in a system which has a number of data distributors, for example a number of brokers in a trading system, each data distributor is configured to have the same data distribution period and the same number of time slots per period. This arrangement has the advantage that there is no advantage to the data recipient in receiving their data from any particular data distributor so eliminating perceptions of unfairness from the data distribution.

Preferably, data receivers are only sent data only M data distribution periods. This has the advantage of making the frequency with which each recipient's data is updated configurable on an individual basis. Preferably, the data distribution period is divided into a number of blocks, each having a number of slots and the data distribution period is processed block by block. Preferably, a delay parameter may be defined to delay the distribution of data to a given receiver by a predetermined amount.

The invention also resides in a method of periodically distributing data to a plurality of data receivers, comprising: dividing a data distribution period into a plurality of time slots; assigning each of the data receivers to a respective one of the time slots; and for each time slot having an assigned data receiver, every M data distribution periods, where M is defined for each data receiver, during the time slot, calculating the data to be sent to the data receiver and sending the data to the data receiver.

According to a second aspect of the invention, there is provided a method of periodically distributing data to a plurality of data receivers, comprising: dividing a data distribution period into a plurality of time slots; assigning each of the data receivers to a respective one of the time slots for distribution of data; on every Jth data distribution period: selecting a random slot of the plurality of slots in the data distribution period; and swapping the position of that random slot in the data distribution period, together with any data receiver assigned to that time slot, with another time slot.

This aspect of the invention also provides apparatus for periodically distributing data to a plurality of data receivers, comprising: a data distributor for distributing data received from a data source to data receiver over a data distribution period, the data distribution period being divided into a plurality of time slots; the data distributor comprising a slot assignor for assigning each of the data receivers to a respective one of the time slots for distribution of data; and a slot position swapper, for every Jth data distribution period selecting a random slot of the plurality of slots in the data distribution period and swapping the position of that random slot in the data distribution period, together with any data receiver assigned to that time slot, with another time slot.

Embodiments of this aspect of the invention have the advantage that long term price firing proximity, wherein one data recipient always receives data shortly after another, is avoided. Preferably, the time slots that are swapped are adjacent. This, in combination with performing the swap only after ever Jth distribution period, enables the firing order for data distribution to be slowly re-arranged in small intervals without it being noticeable to the data recipients.

Preferably, the adjacent time slot is the one after the randomly selected time slot and the swap is performed before the data is calculated. Thus, data is calculated and sent first for data recipient that was in the time slot after the randomly selected time slot before the swap is made. This avoids the problem of hopping which can occur if the swap is made just after data has been sent to a data recipient causing it to be sent twice in a very short time to one recipient and to miss nearly a whole distribution period for another recipient.

The invention also resides in a method of periodically distributing data to a plurality of data receivers, comprising: dividing a data distribution period into a plurality of time slots; assigning each of the data receivers to a respective one of the time slots for distribution of data; and performing a low frequency shuffle of the order of the time slots relative to the data distribution frequency.

BRIEF DESCRIPTION OF THE DRAWINGS

Embodiments of the invention, will now be described, by way of example only, and with reference to the accompanying drawings, in which.

Figure 1:
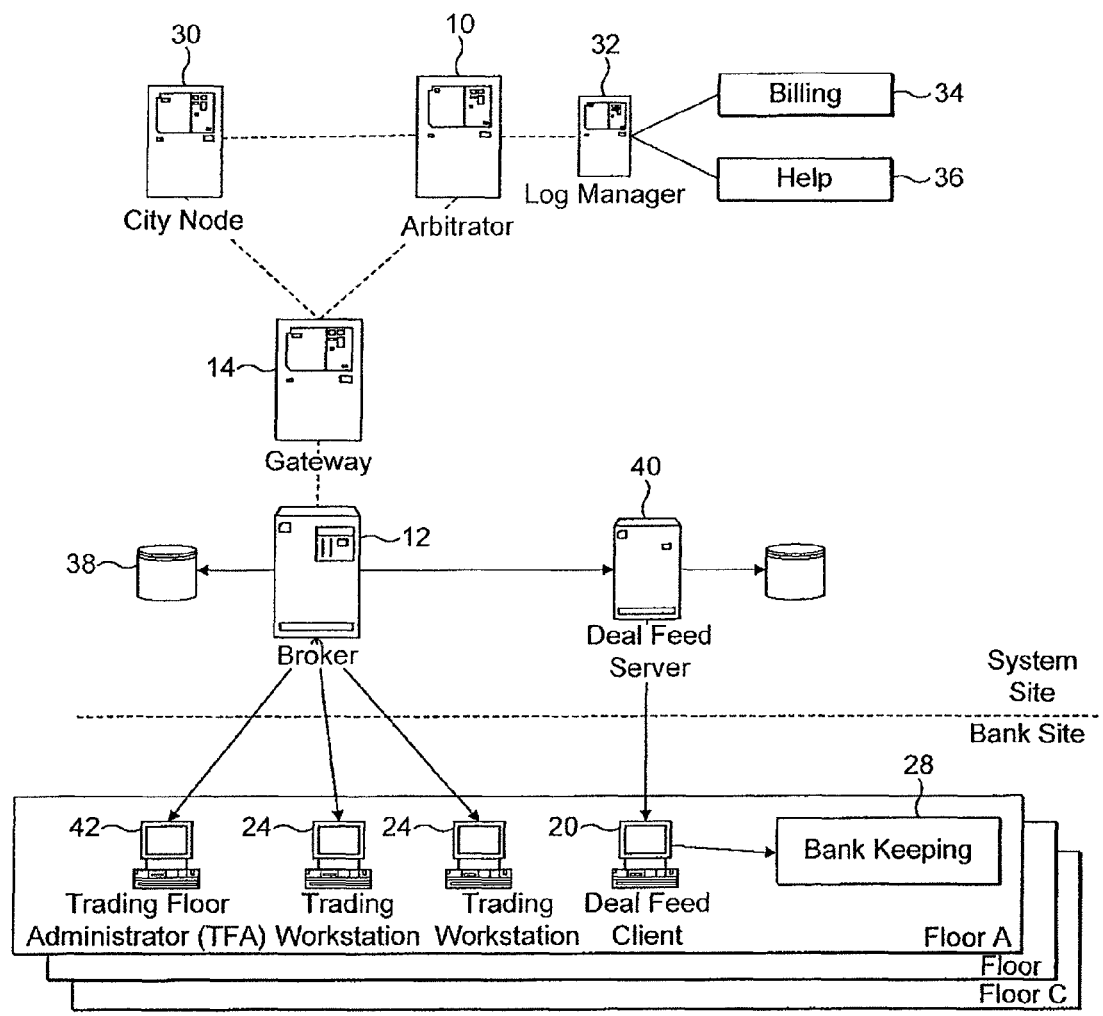
FIG. 1 is a schematic view of a known trading system to which embodiments of the invention may be applied.

The trading system of FIG. 1 is largely as described in the introduction above and is a known trading system. In addition to the arbitrator 10 (other arbitrators are not shown for simplicity), broker 12 (only one of which is shown), and trading devices 24, shown here as trader workstations, the system includes city node 30 which is responsible for distribution of market data and news, as opposed to quote and deal related information, a log manager 32 which maintains a record of arbitrator activity and is used for customer billing 34 and for resolving trading discrepancies via help desk 36. A gateway 14 interfaces the broker with the arbitrator and the city node and a data store 38 holds a record of broker activity. Details of completed deals are provided by the broker to a deal feed server 40 which generates deal tickets which are sent to the counterparties to a deal where they are received by a deal feed client computer 20 on the trading floor. The trading tickets are used to record the banks position by position keeping systems 28 and to settle trades with counterparties. The trading floor shown is one of a number on the system. Floors A, B and C are shown as connected to the broker 12. As well as the trader devices (workstations and/or automated trading interface), each floor will include a trading floor administrator 42 which interfaces with the system to enable an administrator to communicate floor details such as trader identifications and privileges and floor credit limits to the system. The broker 12 is one of a plurality of brokers. Each broker on the system may have a number of trading floors connected to it, typically in the order of 10 to 50. It is important that the manner in which quotes are distributed is not affected by the number of floors attached to the broker.

The system of FIG. 1 is purely exemplary. The present invention is not limited to distribution of quotes in a broker or other distributed type of trading system, it is applicable to any system where is desired to distribute data fairly to a number of parties. This may be a trading system having a different type of architecture such as a centralised system or it may be a system other than a trading system in which the fairness and timeliness of data is important. The invention is not limited to any particular trading system architecture or even to trading systems but has applicability to any system for distributing data, particularly live data, to a number of parties.

Figure 2:
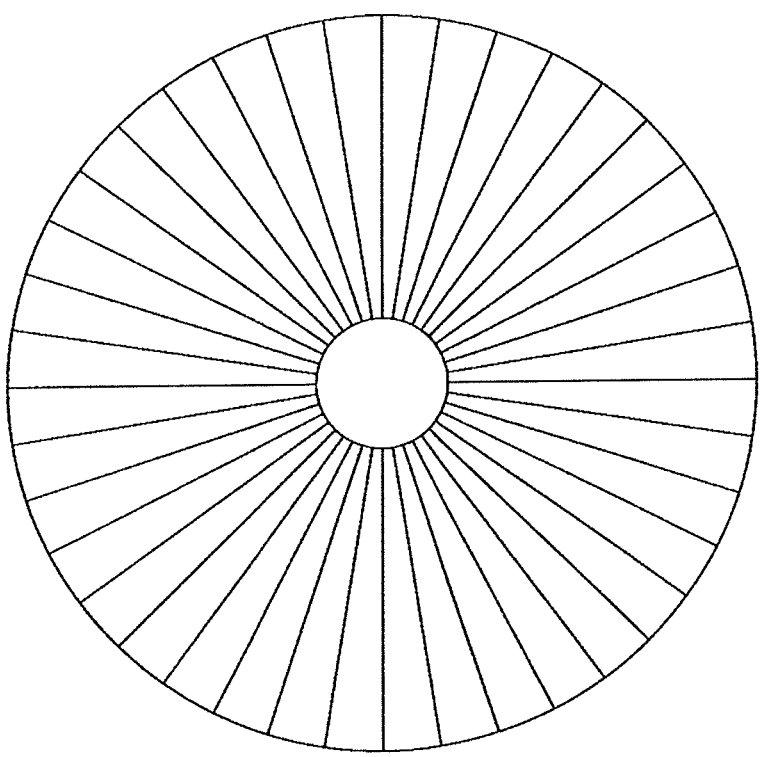
FIG. 2 is a view of a distribution timeslice having a number of firing slots.

In the anonymous trading system of FIG. 1, the brokers distribute quotes received from the arbitrators at a predetermined frequency, for example once per second. The arbitrators are a data source providing data to the brokers, each of which are an example of a data distributor. The brokers distribute the data to trading floors which are examples of data recipients. Although the example described is a trading system, the principles apply to any system for distribution of live, or time critical, data. This period, which is a fixed distribution period or time scale, is not fixed and any other suitable period could be chosen. FIG. 2 shows how this time interval 50 may be sliced or divided into a number of slots 52. In this example the number of slots is 40 but this number is variable and a matter of system design choice. The number of slots may be represented by N. The timeslice has a duration T and each slot has a duration t. It is preferred that t is the same for each slot but this is not essential. To ensure fairness across the entire system, it is preferred that all brokers are configured with the same length T of time slice and the same number of slots N each having the same length t. Trading floors are assigned to slots randomly as each floor subscribes to market views. This is a one-off assignment when the floor first subscribes and is connected to the broker.

As well as assigning actual trading floors to slots, a market data pseudo-floor may be assigned to a vacant slot. This pseudo-floor is used for calculation and distribution of market data which is sent to all recipients regardless of the bilateral credit. One example is the best prices that is available on the system.

The time slice is fixed by reference to the system clock of the broker enabling it to be kept accurately. In some cases, where the market is very active, there may be difficulties in calculating and sending a full market view in a time slot, leading to some slot drift, but this can be made up over subsequent firing events.

Thus each slot corresponds to a precise firing time when the market view is calculated for the broker assigned to the slot. This contrasts with the prior art approach in which market views for all floors were first calculated and then distributed. After calculation, the market view is sent to the subscribing floor with calculation and distribution both being performed within the time slot. Data from the arbitrator is received by the broker continuously. Thus the market view for each trading floor is calculated at a slightly different time from slightly different data. The use of time slots with calculation of market view data within the time slot for a given recipient overcomes the problem of computation to delivery latency discussed above. Moreover, by assigning floors to slots randomly, an efficient distribution of quote firing is achieved.

Figure 3:
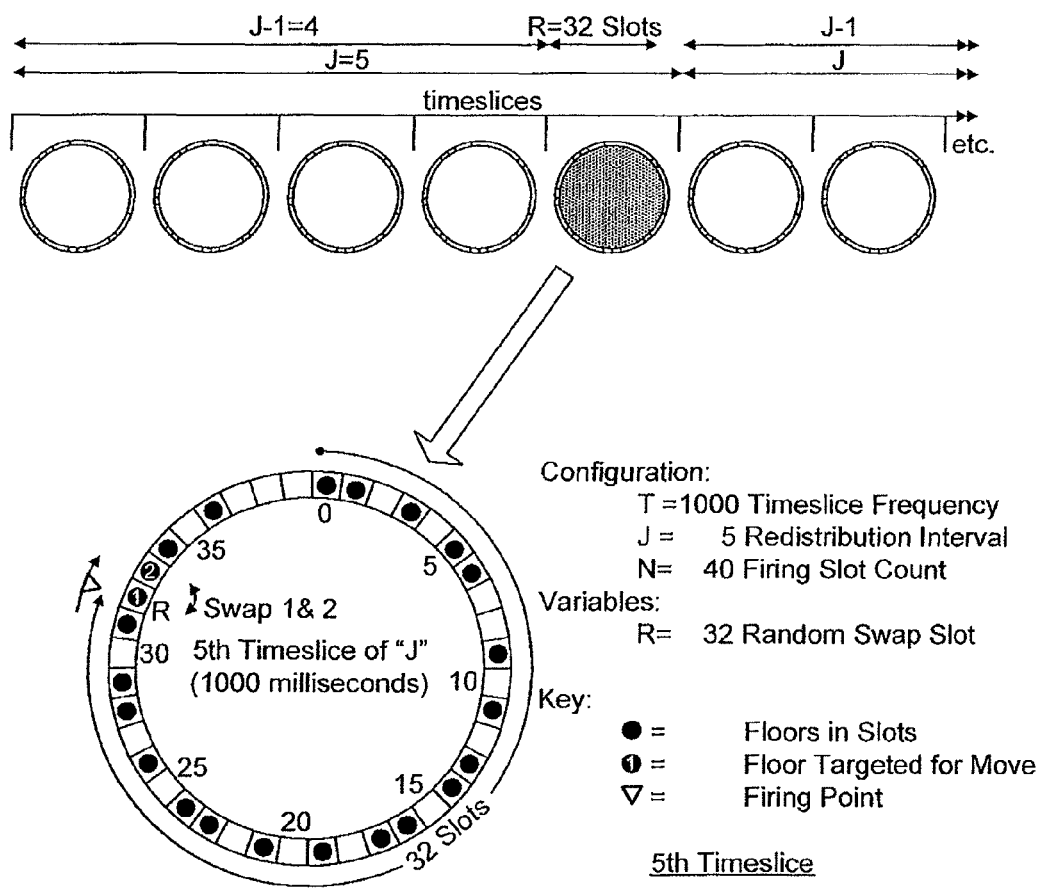
FIG. 3 illustrates the operation of a first embodiment of the invention.

FIG. 3 illustrates a solution to the problem of long term firing proximity. In essence, a low frequency shuffle is used to change the position of a pair of firing slots. Preferably, these slots are adjacent. Preferably, during the last of a configurable number of timeslices the contents of a randomly selected adjacent pair of firing slots is exchanged. It is important that each trading floor receives market views as close to the time slice interval T as possible as any large variation could temporarily distort the market view. In order to achieve this the pitch of the slots must be small. Preferably the pitch is in the order of 1/20$^{th}$ the timeslice. Where T=1000 mS, the pitch P=50 mS. This requires that the number of slots is great enough for the timeslice to be divided up so that each slot is not larger than 1/20$^{th}$ of the timeslice. The figure of 1/20$^{th}$ is preferred for an FX trading market, greater or lesser sizes may be appropriate in other markets or applications of the embodiment of the invention.

It will be appreciated that in many instances, the number of slots will be greater than the number of trading floors connected to the broker. It is preferred that the slots selected for swapping are swapped regardless of whether there is a trading floor assigned to one or both of the slots, but there will be no effect on the relative positions unless there is a floor in one of the pair of slots. In this case there will simply be one pass of the process in which the relative floor positions are unchanged. An alternative approach would be to keep swapping slots until a filled slot was moved. While possible, this approach is not preferred as its risks moving the slot too far in time to maintain the pitch requirement. When there is a large number of slots, say 100, it would be possible to perform several swaps without departing from the pitch requirement. This approach may be more appropriate on other types of trading system or in other data distribution scenarios. In the example of the preferred embodiment it is preferred that the same approach is implemented on each broker to ensure that all trading floors on the system are treated in the same way and that issues of fairness are broker independent.

When swapping slots randomly, there is a danger that a slot that is just about to be fired is swapped so that it is advanced in front of its firing point so that the firing is missed. Similarly, a slot that has just been fired could be swapped backwards so that it is almost immediately fired again. This may be referred to as hopping where the slot hops over the firing point. To avoid hopping the first slot of the pair to be swapped is identified ahead of time and when it is this slot's turn to have its market view calculated, the contents of the slot are swapped with the following slot before doing the calculation.

In FIG. 3, the time slot swapping is performed on the last timeslice of a redistribution interval J, where J is a number of time slices. It is presently preferred that J=5 although this is configurable. The last, or Jth timeslice is truncated to a random number R between 0 and the number of firing slots N−1. The last timeslice is then truncated to the value of R identifying a random swap slot in the final timeslice of the J sequence. Thus is FIG. 3, seven time slices are shown as TS 1-TS 7. T=1000 mS and J=5 with N=40. The random variable R is calculated in this example as 32 so that on the fifth or Jth timeslice the trading floors in the 32$^{nd}$ and 33$^{rd}$ slots are targeted to be swapped around. In FIG. 3, the slots are illustrated around the circumference of the timeslice with the slots filled by a trading floor marked by a solid circle. The two slots to be swapped are shown as 1 and 2 and the dark bordered triangle shows the position of the firing point. It can be seen that the slots are fired in a clockwise order and at the firing point, floor 1 is about to be fired. The swap is performed so that floor 2 is fired in its place and floor 1 is fired immediately after. Thus hopping is avoided and the variation in firing time for each of the floors is the length of one slot, in this case 25 mS.

Once the process has been completed the time slice is completed in the usual order and the process is repeated starting from the end of the Jth timeslice.

In a second embodiment of the invention, the timeslice intervals are configurable. In a trading system, trading floors may include both conventional trader terminals operated by human traders, and automated trading interfaces (Ais), which run trading algorithms. The latter Ais react to market data much more quickly than human traders. In this embodiment of the invention Ai terminals may be configured to receive a less frequent timeslice than a workstation. It is also desirable for an enhanced trading experience to be given to premium customers by changing the frequency with which they receive market views. This is achieved by configuring each trading floor to receive market views as a given multiple of a basic timeslice interval.

To configure floors and Ai terminals with different time slice intervals the basic time slice is reduced to a very short interval, say 1/4 second, and individual floors are instructed to take notice of every nth time slice. To configure a floor to have a 1 second timeslice while the basic time slice is 1/4 second the floor is given a Floor Timeslice Multiplier of 4. This is an instruction to take notice of every fourth time slice. This is achieved by sending the data only every Mth timeslice, where M is the Floor Timeslice Multiplier.

A direct implementation of this approach may not be possible as the minimum time required to wake up a thread, which is typically 20 milliseconds, limits the ability of a Broker to keep up with this faster scheduling. This problem may be overcome by grouping the slots into blocks. A block may have, for example, 5 to 15 slots, preferably 10 slots. The Broker will only wake up a thread for each block of slots and then process each slot in the block in sequence. All other processing including changes in relative firing order is performed as described above with respect to FIGS. 2 and 3. Ai terminals are sent a "take notice of" parameter (Ai Timeslice Multiplier A) to give them a timeslice that is a multiple of the Floor Timeslice Multiplier M for the trading floor to which they are attached.

Thus, the Floor Timeslice Multiplier parameter, M defines the interval between that Floor's Market View timeslices and specifies a number of timeslices. If M equals zero, no workstation market view is calculated by the broker. After each calculation and distribution of the market view, the Broker waits M basic timeslices before processing another Market View for that Floor so that market views are processed every M$^{th}$ timeslice. The Ai Timeslice Multiplier parameter, A for a Floor, defines the interval between Ai Market View timeslices for that floor. If A equals zero, no Ai market view is calculated by the broker, and trading is prohibited. After each distribution of the market view to an Ai, there is a wait of A Market View updates before another Market View is passed on to that Floor's Ai Servers.

The Broker, similarly to the first embodiment described above, keeps a schedule of timeslice firing. However, in this embodiment the schedule is of when timeslices for different firing blocks are initiated. The schedule is divided up into a number of equally spaced firing blocks, each block being divided into a number of slots. When a firing block is fired, the market view for each floor occupying a slot is calculated and distributed in order corresponding to their position in the schedule. It is important that the Broker keeps a record of whether a request for a subscription to market views received from a floor is from a workstation (human trader) or an Ai terminal so that the appropriate multiplier can be applied.

A Basic Time Slice Frequency" parameter T specifies how often the timeslice schedule is initiated. This value also defines the schedule's duration. One presently preferred value of T is 250 milliseconds although T may vary between 100 milliseconds and 5,000 milliseconds. Other values may be appropriate in other system configurations and these values are not limiting. A Firing Block Count B is defined as a configurable parameter. A presently preferred value for B is 5. Again, this value may change according to circumstance and the value given is purely exemplary and not limiting. It is desirable that a minimum value for T/B is set, which, for example, may be 50 milliseconds. Again, this value is not limiting. The number of Slots in firing blocks is preferably a configurable integer Slots in Block Count parameter N. A presently preferred value of N is 20, which combined with the B (B×N) gives a theoretical maximum number of floors (including any Market Data pseudo floors) of 100.

In a further embodiment the Ai terminals and the manual terminals are treated independently. The manual terminals may be fired according to the embodiments described above. The Ai terminals, however, are fired without reference to the corresponding manual floors. The Ai terminals are fired one after another as closely as possible. The process of rearrangement and randomization is still applied to the Ai terminal firing sequence but the sequence is not evenly spread out throughout the data distribution period. Since there may be only a small number of Ai terminals, the firing sequence may occupy only a small portion of the data distribution period. Thus, at most brokers, all the Ai floors connected to those brokers will be fired in a first portion of a time segment with no activity at the tail end of the time segment.

Preferably the firing sequence of all the Ai terminals is delayed by a defined parameter, bEBS. It is presently preferred that the parameter, bEBS, have a value between 0 and 1000 ms. For example, if bEBS equals 200 ms, the firing sequence of all the Ai terminals will commence 200 ms after the start of the data distribution period. Preferably both the calculation and sending of data is delayed. If bEBS equals zero, no delay will be applied and the Ai terminals will be fired at the top of the data distribution period.

The timeslice frequency of the Ai firing sequence may also be configurable as discussed above. The Ai firing sequence may be fired less frequently than the manual terminals distribution. A parameter Asequence, similar to the Ai timeslice multiplier, defines the interval between the Ai market view sequence firing timeslice. If Asequence equals zero, no Ai market view sequence is fired. After each firing of the Asequence, there is a wait of Asequence market view updates before the firing sequence is fired again.

For example, if the time slice interval is every 500 ms, market view data may be processed for the manual terminals twice every second (if M equals zero). If the A sequence parameter is 2, then the Ai sequence will be fired once a second, every second. The Ai sequence will be fired at the top of the second if bEBS equals zero. If, however, bEBS does not equal zero, the Ai sequence will be fired every second but after the defined delay.

It is also preferable, but not essential, to have the ability to delay market view distribution to either a Floor's Workstations or an Ai Server. This may be desirable in order to mitigate communication disparities due to the geographical locations of floors and servers. Preferably, the market view data is calculated as normal but sending of the calculated data is delayed. This can be achieved by setting two parameters: one which sets the delay for the floor's workstations and the other which sets the delay for the Ai Server.

The Floor Price Distribution Delay parameter, FD for a Floor defines the duration of the delay applied prior to distributing the Market View. The FD parameter may specify a number of milliseconds. If FD equals zero, no workstation delay is applied.

The Ai Price Distribution Delay parameter, AD for an Ai Server defines the duration of the delay applied prior to distributing the Ai Market View. The AD parameter may specify a number of milliseconds. If AD equals zero, no Ai delay is applied.

Figure 4:
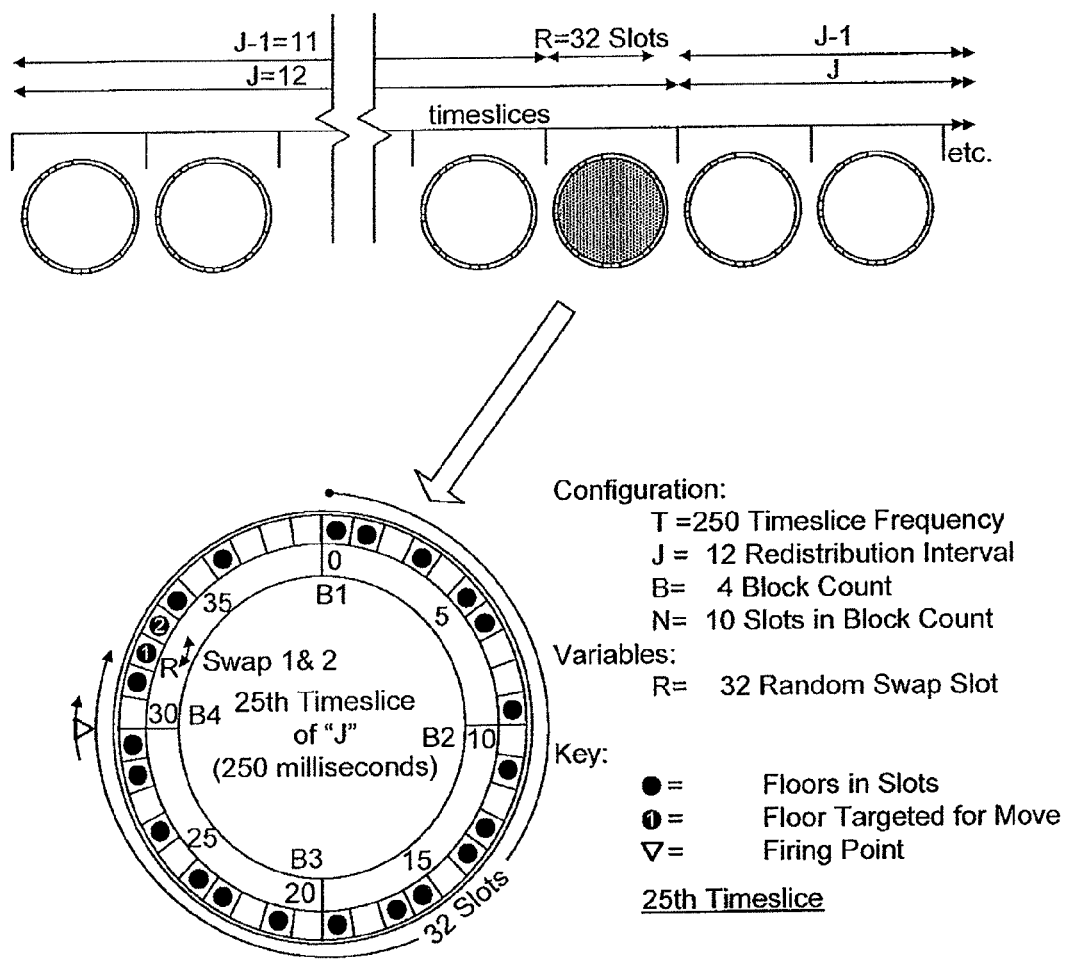
FIG. 4 illustrates the operation of a second embodiment of the invention.

The AD and the FD parameters may be used independently of each other. However, when the AD and the FD parameters reference the same floor, the AD must be equal or greater than the FD. FIG. 4 is similar to FIG. 3, and illustrates the principle of slot swapping applied to the second embodiment of the invention. The FIG. 3 embodiment is modified by the inclusion of the block count B and the slot count N is now the number of slots in each block. The Redistribution Interval parameter, J defines, as a number of timeslices, the interval between the Broker's performances of the floor Timeslice Redistribution routine. Before commencing the last timeslice (the $J^{th}$) a random number R between zero and the Total Number of Slots minus one (B×N−1) is identified. This value R identifies a Random Swap Slot in the final timeslice of J ($12^{th}$ in FIG. 4). Just as the slot at "R" is due to be fired, during the Jth timeslice, any contents of that slot are swapped with any contents of the following slot (R+1). Once the reshuffle has been completed the process is repeated, starting from the end of the $J^{th}$ timeslice. Any Market Data pseudo floor is redistributed among the time slice slots just the same as any other floor.

Thus embodiments of the invention overcome the disadvantages of the prior art. Firstly, the division of a time slice into slots, and the calculation and distribution of individual market views in each slot overcomes the problem of calculation to delivery latency. Secondly, random assignment of floors to slots has the advantage of providing efficient distribution of firing. Thirdly, the random exchange of the position of a pair of adjacent time slots during the last of every J timeslices overcomes the problem of long term firing proximity, ensuring that no trading floor is caught in the shadow of an earlier floor for more than a short time. Fourthly, by ensuring that each broker or other computer distributing data uses timeslice of equal duration, having an equal number of slots, it is ensured that data recipients do not receive an unfair advantage by being attached to a particular data distributor. As a further advantage, the relative duration of the timeslices from floor to floor is configurable.

As mentioned above, the invention is not limited to the distributed trading system described but is applicable to the distribution of trading data from any trading system for example to trading floors or trading devices. Moreover, it is applicable to the distribution of any time critical data from one or more computers acting as data distributors to a plurality of data recipients. When used in a trading system, the invention is applicable to the trading of any tradeable product, including, for example, any financial instrument, where a financial instrument is any instrument having a monetary value.

Many modifications and variations to the embodiments described as possible and will occur to those skilled in the art without departing form the spirit and scope of the invention which is limited only by the following claims.

What is claimed is:

1. A computerized method allowing a trading system to send subsets of data to a plurality of automated trading terminals, the method being carried out by one or more programmed digital computers and comprising the steps of:

digitally storing a table which specifies an order in which data is to be sent to each of the automated trading terminals during each of a plurality of data distribution periods;

periodically updating the table so that the specified order is changed;

during each of a plurality of data distribution periods, determining a respective subset of data to be send to an associated automated trading terminal and sending each respective subset of data to its associated automated trading terminal in the order specified by the table; and sending subsets of data to one or more human controlled data terminals, the frequency at which subsets of data are sent to the human controlled data terminals being greater than the frequency at which subsets of data are sent to the automated trading terminals.

2. The method of claim 1, wherein the order in which the subsets of data is sent to the automated trading terminals is changed every nth data distribution period, where n is an integer greater than one.

3. The method of claim 1, wherein the table is divided into time slots and each of the automated terminals is assigned to a respective time slot.

4. The method of claim 3, wherein the table is periodically updated by switching the time slots to which a pair of automated trading terminals is assigned.

5. The method of claim 4, wherein the time slots assigned to the pair of automated trading terminals are adjacent time slots.

6. The method of claim 4, wherein the time slot initially assigned to a given automated trading terminal is selected randomly.

7. The method of claim 6, wherein the time slot initially assigned to a given automated trading terminal is selected based upon the time that automated trading terminal connects to the computer system in a way that allows it to begin obtaining a periodic distribution of subsets of data from the computer system.

8. The method of claim 4, wherein the switched time slots are first and second time slots, the first time slot precedes the second time slot and the switch occurs before the computer system calculates the subset of data to be sent to the automated trading terminal assigned to the first time slot.

9. The method of claim 8, wherein the second time slot immediately succeeds the first time slot.

10. The method of claim 1, wherein each of the data distribution periods is of equal length.

11. The method of claim 10, wherein each of the time slots is of equal length.

12. The method of claim 1, wherein the trading system includes a plurality of programmed data distributor computers, each data distributor computer being associated with a respective set of automated trading terminals and carrying out the storing, updating, determining and sending steps for its associated subset of automated trading terminals.

13. The method of claim 1, wherein the subsets of data are market data comprising (a) prices at which a product is being offered for sale by one or more potential counterparties and/or (b) prices at which one or more potential counterparties are offering to buy a product.

14. The method of claim 13, wherein the product is a financial instrument.

15. The method of claim 13, wherein the product is foreign currency.

16. A computerized trading system which sends subsets of data to a plurality of automated trading terminals, the computerized trading system comprising one or more computers which:
digitally store a table which specifies an order in which data is to be sent to each of the automated trading terminals during each of a plurality of data distribution periods;
periodically updates the table so that the specified order is changed;
during each of a plurality of data distribution periods, determines a respective subset of data to be send to an associated automated trading terminal and sending each respective subset of data to its associated automated trading terminal in the order specified by the table; and
sending subsets of data to one or more human controlled data terminals, the frequency at which subsets of data are sent to the human controlled data terminals being greater than the frequency at which subsets of data are sent to the automated trading terminals.

17. The computerized trading system of claim 16, wherein the order in which the subsets of data is sent to the automated trading terminals is changed every nth data distribution period, where n is an integer greater than one.

18. The computerized trading system of claim 16, wherein the table is divided into time slots and each of the automated terminals is assigned to a respective time slot.

19. The computerized trading system of claim 18, wherein the table is periodically updated by switching the time slots to which a pair of automated trading terminals is assigned.

20. The computerized trading system of claim 19, wherein the time slots assigned to the pair of automated trading terminals are adjacent time slots.

21. The computerized trading system of claim 18, wherein the switched time slots are first and second time slots, the first time slot precedes the second time slot and the switch occurs before the computer system calculates the subset of data to be sent to the automated trading terminal assigned to the first time slot.

22. The computerized trading system of claim 21, wherein the second time slot immediately succeeds the first time slot.

23. The computerized trading system of claim 18, wherein the time slot initially assigned to a given automated trading terminal is selected randomly.

24. The computerized trading system of claim 18, wherein the time slot initially assigned to a given automated trading terminal is selected based upon the time that automated trading terminal connects to the computer system in a way that allows it to begin obtaining a periodic distribution of subsets of data from the computer system.

25. The computerized trading system of claim 18, wherein each of the time slots is of equal length.

26. The method of claim 16, wherein each of the data distribution periods is of equal length.

27. The computerized trading system of claim 16, wherein the computerized trading system includes a plurality of programmed data distributor computers, each data distributor computer being associated with a respective set of automated trading terminals and carrying out the storing, updating, determining and sending steps for its associated subset of automated trading terminals.

28. The computerized trading system of claim 27, wherein the subsets of data are market data comprising (a) prices at which a product is being offered for sale by one or more potential counterparties and/or (b) prices at which one or more potential counterparties are offering to buy a product.

29. The computerized trading system of claim 28, wherein the product is a financial instrument.

30. The computerized trading system of claim 16, wherein the product is foreign currency.

31. A non-transitory computer readable media having software stored thereon which enables a data distributor computer to:
digitally store a table which specifies an order in which data is to be sent to each of the automated trading terminals during each of a plurality of data distribution periods;
periodically update the table so that the specified order is changed;
during each of a plurality of data distribution periods, determine a respective subset of data to be send to an associated automated trading terminal and send each respective subset of data to its associated automated trading terminal in the order determined by the table; and send subsets of data to one or more human controlled data terminals, the frequency at which subsets of data are sent to the human controlled data terminals being greater than the frequency at which subsets of data are sent to the automated trading terminals.

32. The non-transitory computer readable media of claim 31, wherein the order in which the subsets of data is sent to the automated trading terminals is changed every nth data distribution period, where n is an integer greater than one.

33. The non-transitory computer readable media of claim 31, wherein the table is divided into time slots and each of the automated terminals is assigned to a respective time slot.

34. The non-transitory computer readable media of claim 33, wherein the table is periodically updated by switching the time slots to which a pair of automated trading terminals is assigned.

35. The non-transitory computer readable media of claim 34, wherein the time slots assigned to the pair of automated trading terminals are adjacent time slots.

36. The non-transitory computer readable media of claim 35, wherein the switched time slots are first and second time slots, the first time slot precedes the second time slot and the switch occurs before the computer system calculates the subset of data to be sent to the automated trading terminal assigned to the first time slot.

37. The non-transitory computer readable media of claim 36, wherein the second time slot immediately succeeds the first time slot.

38. The non-transitory computer readable media of claim 33, wherein the time slot initially assigned to a given automated trading terminal is selected randomly.

39. The non-transitory computer readable media of claim 33, wherein the time slot initially assigned to a given automated trading terminal is selected based upon the time that automated trading terminal connects to the computer system in a way that allows it to begin obtaining a periodic distribution of subsets of data from the computer system.

40. The non-transitory computer readable media of claim 31, wherein each of the data distribution periods is of equal length.

41. The non-transitory computer readable media of claim 40, wherein each of the time slots is of equal length.

42. The non-transitory computer readable media of claim 31, wherein the subsets of data are market data comprising (a) prices at which a product is being offered for sale by one or more potential counterparties and/or (b) prices at which one or more potential counterparties are offering to buy a product.

43. The non-transitory computer readable media of claim 42, wherein the product is a financial instrument.

44. The non-transitory computer readable media of claim 42, wherein the product is foreign currency.

* * * * *